United States Patent [19]
Yoshino

[11] Patent Number: 5,005,132
[45] Date of Patent: Apr. 2, 1991

[54] ANTILOCK BRAKE CONTROL DEVICE

[75] Inventor: Masato Yoshino, Itami, Japan

[73] Assignee: Sumitomo Electric Industries, Ltd., Osaka, Japan

[21] Appl. No.: 438,006

[22] Filed: Nov. 20, 1989

[51] Int. Cl.⁵ .............................................. B60T 8/58
[52] U.S. Cl. .............................. 364/426.02; 303/100; 303/103
[58] Field of Search ................... 364/426.02; 180/197; 303/95, 103, 106, 100

[56] References Cited

U.S. PATENT DOCUMENTS

| | | | |
|---|---|---|---|
| 4,693,522 | 9/1987 | Wupper et al. | 303/106 |
| 4,755,945 | 7/1988 | Kade et al. | 364/426.02 |
| 4,759,589 | 7/1988 | Leiber | 364/426.02 |
| 4,762,376 | 8/1988 | Matsubara | 303/103 |
| 4,790,607 | 12/1988 | Atkins | 364/426.02 |
| 4,805,103 | 2/1989 | Matsuda | 303/95 |

*Primary Examiner*—Gary Chin
*Attorney, Agent, or Firm*—Wenderoth, Lind & Ponack

[57] ABSTRACT

An antilock brake control device for use in a full-time four-wheel drive car has wheel rotation sensors for detecting the wheel rotations of the vehicle wheels, an electronic control circuit for calculating the wheel speeds, the estimated vehicle speed, the decelerations and the slip rates of the wheels from the wheel rotation signals from the sensors and for producing fluid pressure control signals based on the results of the calculation, and a fluid pressure control unit for controlling the braking force on the wheels independently of one another in response to the fluid pressure control signals. The electronic control circuit is adapted to calculate the coefficient of friction between the wheels and the road surface and the sum of slip rates of both rear wheels. If the coefficient of friction is higher than a first predetermined value and the sum of slip rates is smaller than a second predetermined value, the braking forces on all the wheels are controlled independently of one another. If the sum of slip rates is larger than the second predetermined value, the braking forces on the front wheels are controlled independently of each other and those on the rear wheels are controlled based on the wheel speed of one of the rear wheels rotating at a lower speed than the other.

4 Claims, 6 Drawing Sheets

ANTILOCK BRAKE CONTROL DEVICE

BACKGROUND OF THE INVENTION

The present invention relates to an antilock brake control device capable of braking the wheels of an automobile at a maximum braking efficiency.

In order to control the brake assembly in an automobile efficiently according to the change in the friction with the road, an antilock brake control device should have an antilock control function which selectively reduces, holds and increases the braking pressure, while the brake pedal is being trodden, to repeatedly release and apply the brake at very short time intervals so as to increase the braking efficiency to its maximum.

A control unit for such an antilock control comprises wheel speed sensors for detecting the wheel rotations, an electronic control circuit for calculating the wheel speeds, decelerations, estimated vehicle speed and the slip rates of the wheels from the detected wheel rotation signals to produce control signals for increasing, holding or reducing the braking pressure on the basis of the results of the calculations, and a fluid pressure control unit which receives the control signals from the control circuit and adjusts the braking pressure from a master cylinder to feed them to respective wheel cylinders.

The electronic control circuit performs various operations as described above from the detected wheel rotation signals to judge whether the wheels are showing a tendency to lock or recover from the locked state by checking the fluctuations of the slip rates and decelerations. On the basis of the result of the judgement, it supplies control signals for reducing, holding or increasing the braking pressure to the fluid pressure control unit.

An ordinary fluid control unit of this type comprises solenoid valves (cutoff valves and flow control valves may be added optionally), check valves, hydraulic pumps with motors, accumulators and reservoir tanks. The valves of one of the above types are provided in the braking lines between the master cylinder and the wheel cylinders to control the flow of braking pressure or pump pressure.

There are three known methods for controlling the flow from the master cylinder to the wheel cylinders to brake the wheels, namely the four-channel control in which one set of solenoid valves are allocated to each wheel to control the wheels independently of one another, the three-channel control in which one set of solenoid valves are allocated to each of the right and left front wheels and another set is allocated to both of the rear wheels, and the two-channel control in which one set of solenoid valves are allocated to each of the front wheels so that the braking pressures on the rear wheels will follow the pressure on one of the front wheels.

As a method of applying fluid pressure control signals to the hydraulic circuit, it is known to reduce the braking pressure on both the front wheels or both the rear wheels at one time if one of the front wheels or one of the rear wheels at the side put under lower hydraulic pressure (namely the side where the coefficient of friction with the road surface is smaller) shows a tendency to lock (such a control mode is hereinafter referred to as the select-low mode). Another known method is to reduce the braking pressure on the wheels at both sides if the wheel at one side put under higher hydraulic pressure shows a tendency to lock (select-high mode).

Still another method is known as the independent control mode in which the respective wheels are controlled independently of one another according to the road condition. It is also known to reduce the braking pressure on each diagonally opposed pair of wheels associated by X piping, if one of the pair of wheels rotating at a lower speed shows a tendency to lock (diagonal select-low mode).

The select-low mode is known to be effective in increasing the resistance of the wheels to lateral forces. This will lead to an improvement in the directional stability and drivability of the vehicle. But with this method, it is often difficult to gain a sufficient braking force. Thus, the braking distance tends to be longer. In the select-high mode, the wheels can be braked with a sufficient braking force but the resistance to lateral forces are not enough. The independent control mode tends to be costly but has an advantage that the wheels can be controlled delicately according to the road condition. In view of advantages and disadvantages of the above-described control modes, it has been believed to be the best way to control the front wheels on the independent or select-high principle and control the rear wheels on the select-low principle.

Such prior art methods are intended for front wheel drive (FWD) cars and rear wheel drive (RWD) cars, but can also be applied to four wheel drive (4WD) cars by adding some modifications to adapt to their driving system as disclosed e.g. in Japanese Patent Publication 62-238158. This publication discloses an antilock control method applicable to a car capable of switching its driving mode between FWD and 4WD. When the driving mode switches, the antilock control mode, too, is adapted to switch from one mode to another mode. Namely, during the FWD mode, both front wheels are controlled independently of each other and both rear wheels are controlled on the select-low mode (three-channel control). During the 4WD mode, each diagonally opposed pair of wheels are controlled on the select-low mode (two-channel control).

A 4WD car has a front shaft and a rear shaft joined together through a viscous coupling. If there is a difference in rotating speed between the front and rear shafts, the driving force on the wheels connected to one of the front and rear shafts rotating at a lower speed might not be efficiently transmitted to the road surface. This problem is prevented because such a driving force is partially transmitted to the other shaft through the viscous coupling, thus increasing the driving force on the other wheels. While the abovementioned difference in the rotating speed is small, the torque transmitted between the front and rear shafts through the viscous coupling is small enough not to cause interference between axles. Thus, the wheels can be braked with a sufficient braking force by controlling the respective wheels independently of one another.

But if the difference in rotating speed rises above a certain level, the torque transmitted between the shafts and thus the interference between the axles will increase to such an extent as to cause jerkiness or skidding of the vehicle and thus to worsen its directional stability.

In the above noted prior art, this problem is tackled by controlling the wheels on the diagonal select-low mode. With this control mode, the torque transmitted between the shafts can be reduced to a minimum, because the respective diagonally opposed pairs of wheels are controlled on the select-low basis and thus the difference of torque between the front and rear wheels can be kept small while keeping high directional stability of the vehicle.

But, because the viscous coupling has a limited torque transmission capability, if the wheels are controlled on the diagonal select-low principle and especially if the coefficient of friction at one side differs from that at the other side, the braking distance might be extended. Furthermore, if the vehicle is running on a road having an extremely low coefficient of friction, the slip rates of the wheels tend to increase even if they are controlled on the diagonal select-low principle, thus lowering the directional stability of the vehicle.

In the aforementioned prior art methods, the wheels were always controlled on the diagonal select-low principle during the 4WD mode in spite of those problems.

SUMMARY OF THE INVENTION

It is an object of the present invention to provide an antilock brake control device which obviates the above-said shortcomings.

In accordance with the present invention, there is provided an antilock brake control device for use in a full-time four-wheel drive motor vehicle, comprising wheel rotation sensors for detecting the wheel rotations of the wheels of the vehicle, an electronic control circuit for calculating the wheel speeds, the estimated vehicle speed and the decelerations and the slip rates of the wheels from the detected wheel rotation signals and for producing fluid pressure control signals on the basis of the results of the calculation, and a fluid pressure control unit for controlling the braking forces on the wheels independently of one another in response to the fluid pressure control signals, the electronic control circuit having a means for calculating the coefficient of friction between the wheels and the road surface and the sum of slip rates of both rear wheels to control all the wheels independently of one another if the coefficient of friction is high and the sum of the slip rates is small and to control the front wheels independently of each other and control the rear wheels based on the information supplied from the wheel rotation sensor for one of the rear wheels rotating at a lower speed than the other, if the sum of the slip rates is large.

Furthermore, according to the present invention, in order to reduce the influence of the torque transmitted between the front and rear wheels while the coefficient of friction with the road surface is low and the sum of the slip rates of the rear wheels is large, the abovementioned control circuit may be adapted to control the four wheels independently of one another, if the coefficient of friction is high and the sum of the slip rates is small, to control the front wheels independently of each other and control the rear wheels based on the information supplied from the wheel rotation sensor for one of the rear wheels rotating at a lower speed than the other, if the coefficient of friction is high and the sum of the slip rates is large, or if the coefficient of friction is low and the sum of the slip rates is small, and to control each front wheel based on the information supplied from the wheel speed sensor for one of each diagonally opposed pair of wheels rotating at a lower speed than the other and control the rear wheels based on the information supplied from the wheel rotation sensor for one of the rear wheels rotating at a lower speed than the other, if the coefficient of friction is low and the sum of the slip rates is large.

The antilock control starts by the operator treading the brake pedal. As the wheel speed decreases by increasing the braking pressure, the electronic control unit will calculate the change of wheel speeds. Based on the wheel speeds, the estimated vehicle speed the coefficient of friction $\mu$ with the road surface and the sum of slip rates SR of the rear wheels are calculated. The $\mu$ values as well as SR values are compared with reference values $\mu_o$ and THR, respectively, to give one of the following four results.

If $\mu > \mu_0$ and $SR < THR$, then all the wheels should be controlled independently of one another. In such a case, since the $\mu$ value is large and thus the wheel restraining torque is sufficiently large compared with the internally transmitted torque, the braking force can be effectively transmitted from the front wheels to the road surface. Also, since the sum of the slip rates of the rear wheels is small and the internally transmitted torque is sufficiently small compared with the wheel restraining force, the rear wheels can be braked at a high efficiency by controlling them independently of each other. Since the SR value is small, the directional stability of the vehicle can be kept high.

If $\mu > \mu_0$ and $SR > THR$, or if $\mu < \mu_0$ and $SR < THR$, the front wheels should be controlled independently of each other and the rear wheels should be controlled on the select-low mode.

The front wheels are controlled independently of each other for the same reasons as described above. The rear wheels are controlled on the select-low mode in such a case, because if the internally transmitted torque is small compared with the wheel restraining force and the sum of the slip rates of the rear wheels are large, the directional stability of the vehicle tends to deteriorate, whereas if the sum of the slip rates of the rear wheels is small and the internally transmitted torque is approximately equal to the wheel restraining force, then the sum of the slip rates tends to increase. This means that the directional stability can be improved by controlling the rear wheels on the select-low mode.

The above-described arrangement will make it possible to control the vehicle so as to be adaptable to any road condition while keeping a sufficient directional stability, except for a few abnormal cases. But the following control method may be further added to the above-described arrangement.

Namely, with this control method, the front wheels are controlled on the diagonal select-low mode while controlling the rear wheels on the select-low mode between the rear wheels if $\mu < \mu_0$ and $SR > THR$.

Since the internally transmitted torque is approximately equal to the wheel restraining force and the sum of the slip rates of the rear wheels is large in such a case, the interference between axles can be prevented by controlling the front wheels on the diagonal select-low mode and the directional stability of the vehicle can be kept high by controlling the rear wheels on the select-low mode therebetween.

In any of the above-described control methods, when controlling the detected wheels independently, the wheel rotations are used as is to calculate the slip rates and the decelerations. Based on the results of the calculation, it is judged whether the wheels are showing a tendency to lock or recovering from the locked state. Based on the results of such a judgement, one of three control signals, i.e. pressure increase, pressure hold and pressure reduction signals, are issued.

When controlling the rear wheels on the select-low mode therebetween, the slip rates and the decelerations are calculated after replacing the higher one of the detected wheel rotations of the rear wheels with the lower one. Then, the same judgement as described above will be made to produce a control signal.

When controlling the front wheels on the diagonal select-low mode, the selection of wheel rotation is made between each diagonally opposed pair of wheels in the same manner as with the above-described select-low mode.

When controlling wheels on the select-low mode, the results of the calculation of the higher one of the wheel speeds, such as slip rate and deceleration, may be replaced with those of the lower one of the wheel speeds, instead of replacing the higher one of the wheel speeds with the lower one, to obtain the same results.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Figure 7:
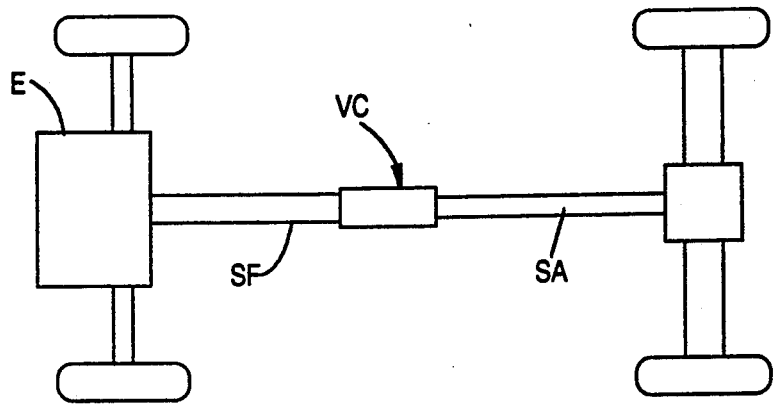
FIG. 7 is a schematic view of the power transmission of a four-wheel drive car.

FIG. 7 shows a full-time 4WD car to which the antilock brake control device embodying the present invention is applicable. A 4WD car is generally provided with a viscous coupling VC between a shaft for the front wheels SF and a shaft for the rear wheels SA. If the driving force generated by the engine E cannot be transmitted to the road surface through the front wheels sufficiently, the driving force on the front wheels is partially transmitted to the rear wheels through the viscous coupling VC and then to the road surface so that the rear wheels can make up for the shortage of driving force on the front wheels.

Figure 1:
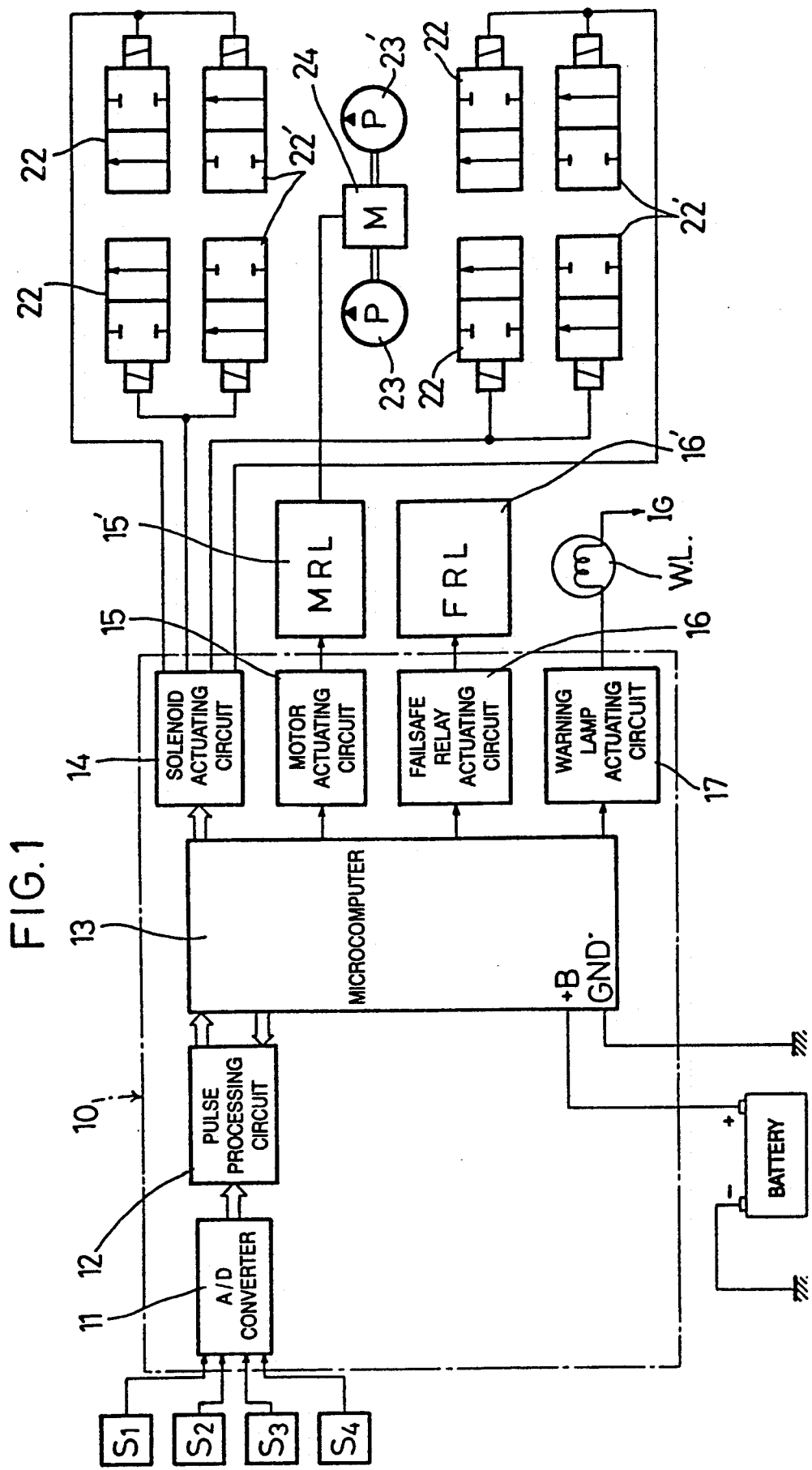
FIG. 1 is a block diagram of the electronic control circuit in the antilock brake control device embodying the present invention.

As shown in FIG. 1, the antilock brake control device according to the present invention has wheel rotation sensors S1 to S4 for detecting the wheel rotations of the wheels and an electronic control circuit 10 including an A/D converter 11 for converting the wheel rotation signals from the wheel rotation sensors into pulse signals, a pulse processing circuit 12 for processing the pulse signals, and a microcomputer 13.

The microcomputer 13 calculates the estimated vehicle speed, decelerations, slip rates, etc. from the pulse signals representative of the wheel speeds, and feeds control signals obtained as a result of the above calculations to a solenoid actuating circuit 14, and a motor actuating circuit 15. A failsafe relay actuating circuit 16 and a warning lamp actuating circuit 17 are also connected with the microcomputer 13. W.L. designates a warning lamp.

As shown in FIG. 1, the solenoid actuating circuit 14 is adapted to feed control signals to four pairs of solenoid valves 22 and 22' (two-position changeover valves) through four lines so as to selectively increase, hold or reduce the braking pressure on the brake cylinders for the respective wheels by turning the solenoid valves 22 and 22' ON and OFF.

Figure 2:
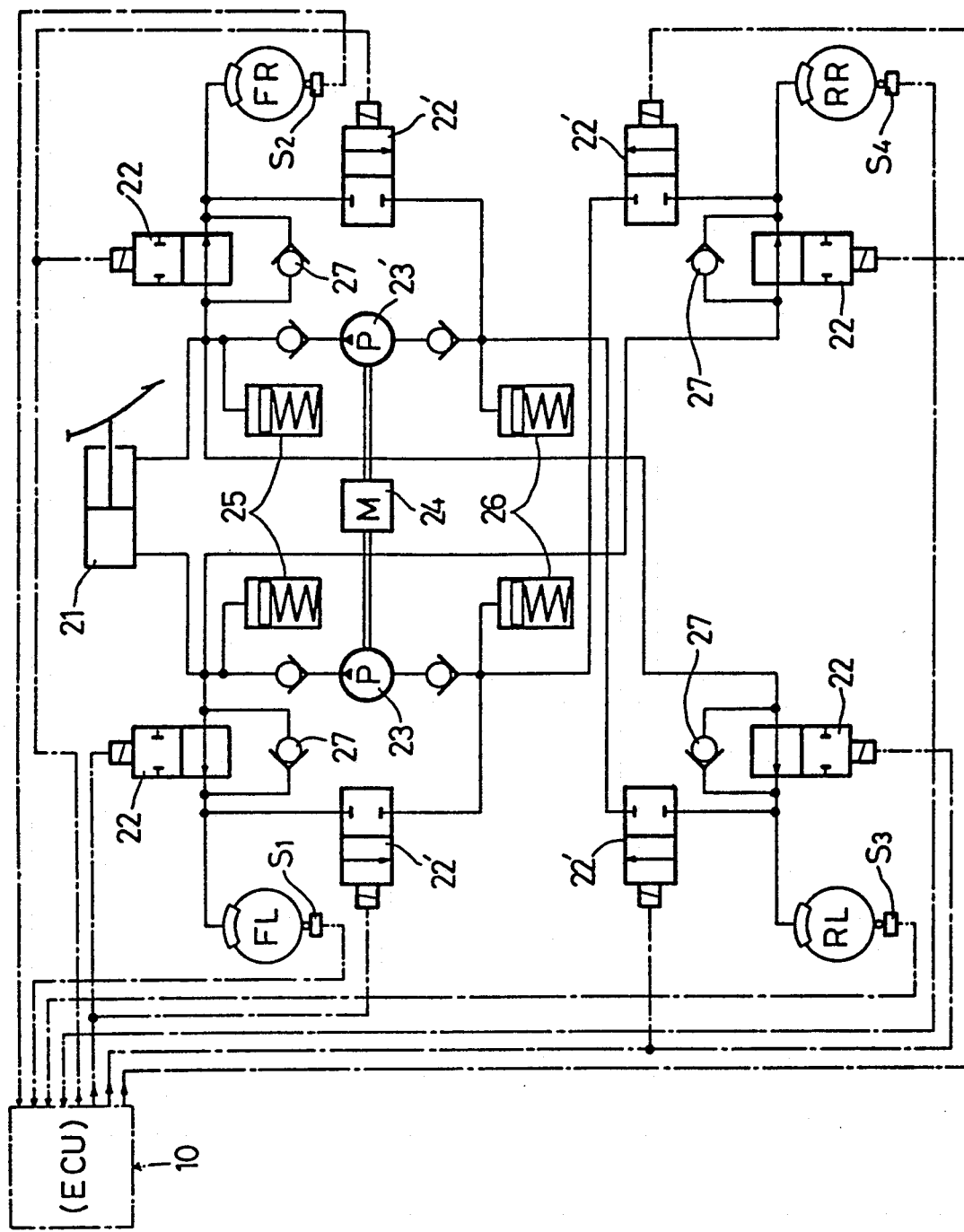
FIG. 2 is a block diagram of the hydraulic circuit of the same.

As shown in FIG. 2, the hydraulic circuit in this embodiment comprises a master cylinder 21, two sets of fluid pressure control units and wheel cylinders for the respective wheels. Each fluid pressure control unit is provided with two pairs of solenoid valves 22 and 22', a hydraulic pump 23, a motor 24, an accumulator 25, a reservoir tank 26 and check valves 27. The braking pressure generated in the master cylinder 21 is transmitted through two lines to the respective front wheels. The braking pressure transmitted to each of the front wheels is distributed through a bifurcated line to each of the rear wheels. In other words, the front and rear wheels are connected by X piping. One pair of solenoid valves 22 and 22' and one check valve 27 are allocated to each wheel. One hydraulic pump 23, one accumulator 25 and one reservoir tank 26 are provided in each of the right and left braking pressure lines. The motor 24 is of a dual-shaft drive type to drive both hydraulic pumps 23. The hydraulic circuit of this type is called a circulating type circuit.

FIGS. 3 to 6 show how the antilock brake control device according to the present invention operates.

Figure 3:
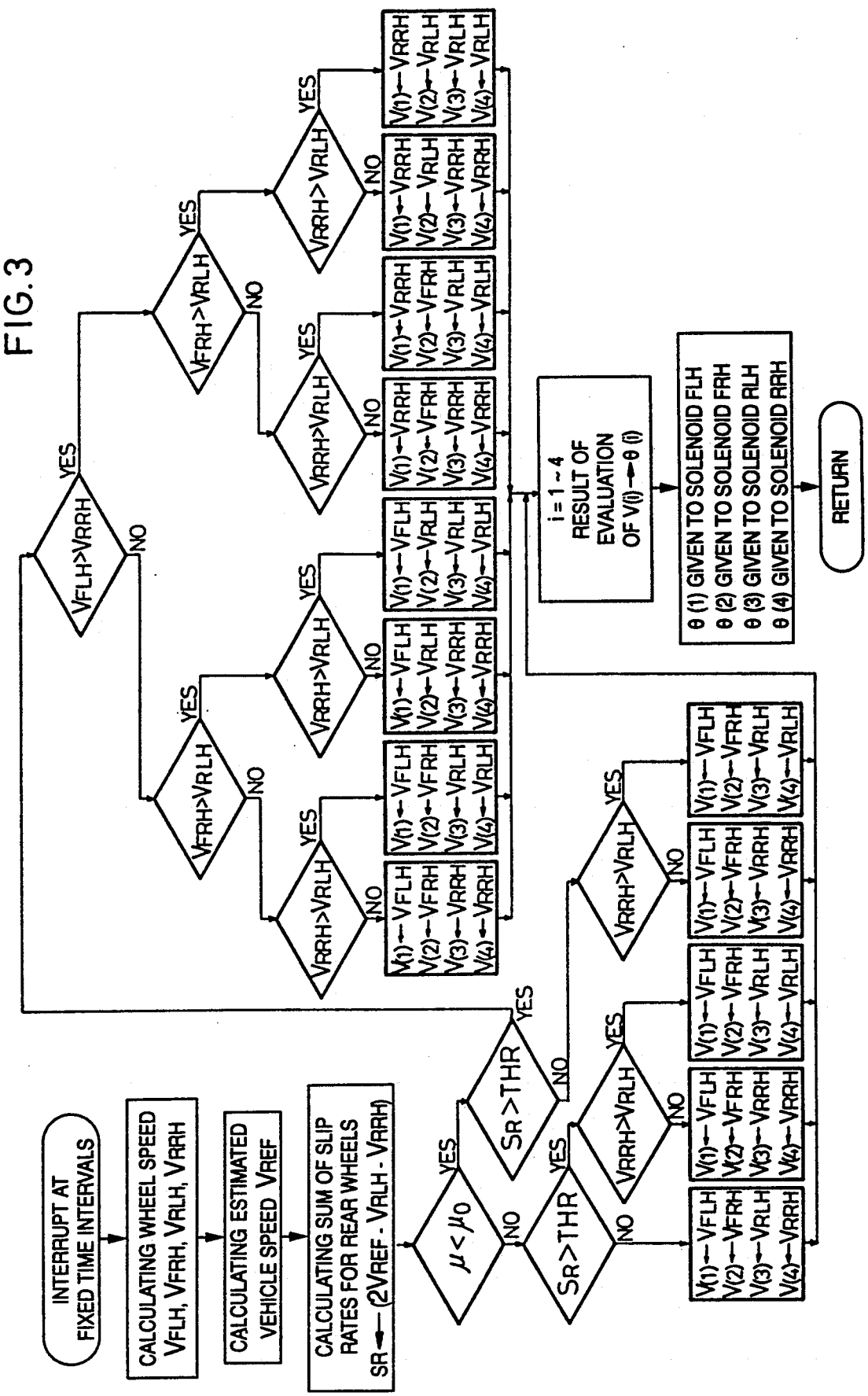
FIG. 3 is a flowchart of the sub-program stored in the electronic control circuit.

When the vehicle is activated and starts moving, the wheel rotation signals will be fed into the electronic control circuit 10. The microcomputer 13 will calculate the wheel speeds $V_{FLH}$, $V_{FRH}$, $V_{RLH}$ and $V_{RRH}$. When the brake pedal is trodden, the antilock control will begin. As shown in FIG. 3, the microcomputer 13 will calculate the estimated vehicle speed $V_{REF}$, the average coefficient of friction between the wheels and the road surface and the sum of slip rates of the rear wheels given by $SR = (2V_{REF} - V_{RLH} - V_{RRH})$ on the basis of the wheel speeds which change as a result of braking.

The coefficient of friction $\mu$ is compared with a predetermined value $\mu_0$ which is a value at which the driving force or braking force on the wheels is transmitted to the road surface most efficiently.

The sum of slip rates SR is then compared with a threshold value THR irrespective of the value of $\mu$. THR is a value determined on the basis of whether or not the driving stability is badly influenced if all the wheels are controlled independently. The directional stability of the vehicle is supposed to decrease.

These comparisons will give one of the following four possible combinations of the values of $\mu$ and SR. According to the result of the comparison, the wheels are controlled in the manner shown below.

| $\mu$ (coefficient of friction) | SR (sum of slip rates of both rear wheels) | How controlled |
| --- | --- | --- |
| (1) high | small | independent control for four wheels |
| (2) low | small | independent control for front wheels select-low control for rear wheels |
| (3) high | large | independent control for front wheels select-low control for rear wheels |

| μ (coefficient of friction) | SR (sum of slip rates of both rear wheels) | How controlled |
|---|---|---|
| (4) low | large | diagonal select-low control for front wheels select-low control for rear wheels |

If the result is (1), which means that the braking force can be transmitted efficiently to the road surface because the value of μ is high and that the directional stability is high because the SR value is small, all the wheels are controlled independently of one another to assure a large braking force.

If the result is (2), though the SR value is small at first, it tends to increase by the influence of the torque transmitted from the front wheels because the μ value is low. Thus, the front wheels are controlled independently of each other to assure a sufficient braking force, while the rear wheels are controlled on the select-low principle to keep a high directional stability.

If the result is (3), the braking force is sufficient because the μ value is high. But the directional stability tends to be low because the SR value is large. Thus the wheels are controlled in the same manner as in case of the result (2).

If the result is (4), a sufficient braking force is difficult to come by because the μ value is low and the SR value is large. Thus, the rear wheels are controlled on the select-low principle to reduce the interference between the front and rear wheels as much as possible and at the same time to gain higher directional stability of the vehicle as well as higher braking force.

As shown in FIG. 3, the speeds of the respective wheels are substituted one for another according to the results of comparison of the μ and SR values.

If the result is (1), in other words, if the judgements on whether or not $\mu < \mu_0$ as well as whether or not $S_R > THR$ are both NO, the V(i) (i=1 to 4) values will remain unchanged, i.e. the substitution from the values $V_{FLH}$ to $V_{RRH}$ will not take place so as to control the wheels independently of one another.

If the result is (3), it is determined whether or not $V_{RRH} > V_{RLH}$ and according to the result of the comparison the wheel speed value of one of the rear wheels judged to be rotating at a higher speed is replaced with the lower wheel speed value.

If the result is (2), in other words, the judgement on whether or not SR > THR is NO, the wheel speed values will be substituted one for another in the same manner as in case the result is (3).

If the result is (4), it is determined whether or not $V_{FLH} > V_{RRH}$ and whether or not $V_{FRH} > V_{RLH}$ to control the diagonally opposed pairs of wheels on the select-low principle, i.e. to give one of four different results. Then it is determined which of the rear wheels is rotating at a higher speed than the other, for each of the above four results, to control the rear wheels on the select-low principle. This means that there are eight possible combinations of the V(i) values.

Figure 4:
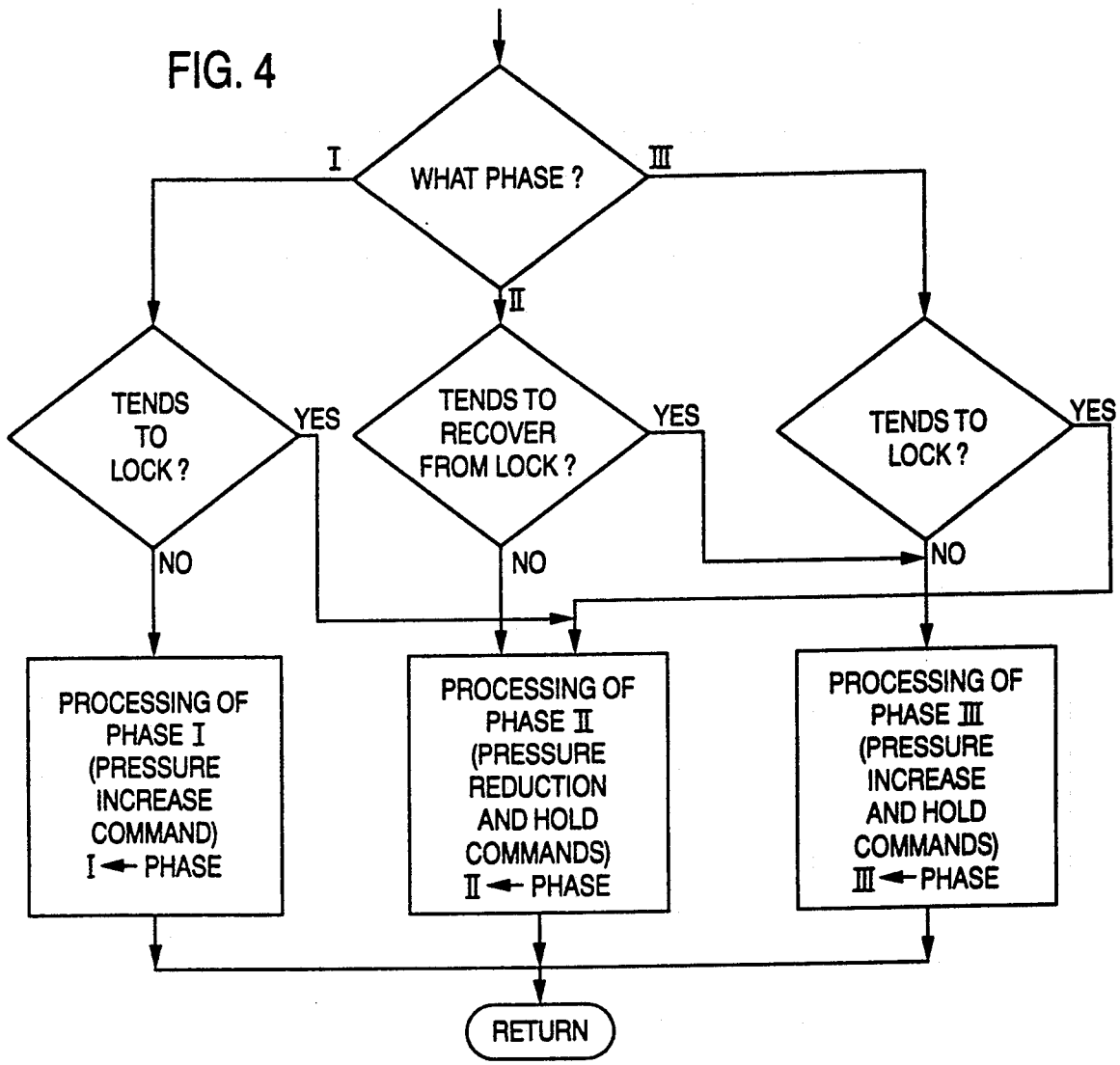
FIG. 4 is a partial flowchart of the program for a ordinary antilock control.

The wheel speeds V(i) (i=1 to 4) are determined so as to fit one of the above-described 13 different combinations and a re-evaluation is made for the newly determined V(i) values to give results θ(i) (i=1 to 4) which include the slip rates and the decelerations. According to the results θ(i), the program will be set to one of three phases, Phase I to Phase III, so as to give command signals to solenoids $F_{LH}$, $F_{RH}$, $R_{LH}$ and $R_{RH}$ as shown in FIG. 4, which is a flow chart of a program for ordinary antilock control provided between the block for evaluating the V(i) values and the block for giving signals to the solenoids in FIG. 3. In Phase I, the pressure increase command is continuously given, in Phase II, the pressure reduction and pressure hold commands are alternately given and in Phase III, the pressure increase and pressure hold commands are alternately given.

Since the program in FIG. 4 is executed after initialization and after setting the Phase to Phase I in a main program (described later), it starts with Phase I and a judgement is made as to whether or not the wheels are showing a tendency to lock. This judgement is made based upon the decelerations and the slip rates calculated from the V(i) (i=1 to 4) values. If no locking tendency is detected, the Phase I command, i.e. the command to continuously increase pressure is given to the solenoids. Since the wheels are continuously braked in this state, the locking tendency of the wheels will intensify with time. Upon detection of the locking tendency, the phase will switch from phase I to Phase II to give the pressure reduction and pressure hold commands alternately. The Phase II command will relieve the wheels from getting locked. Once the wheels are found out to be recovering from the locking state, the phase will switch from Phase II to Phase III to alternately give the pressure increase and pressure hold commands and thus to increase the braking pressure slowly. The wheels will thus show a tendency to lock again and this tendency will be detected, thus switching the phase from Phase III back to Phase II. The phase changes between Phase II and Phase III in such a manner that the wheels can be braked most efficiently.

One of the three phases, Phase I to Phase III, is selected based on the results of evaluation θ(i) (i=1 to 4) which are in turn calculated from the V(i) (i=1 to 4) values. This means that the V(i) values determine the phase.

Figure 5:
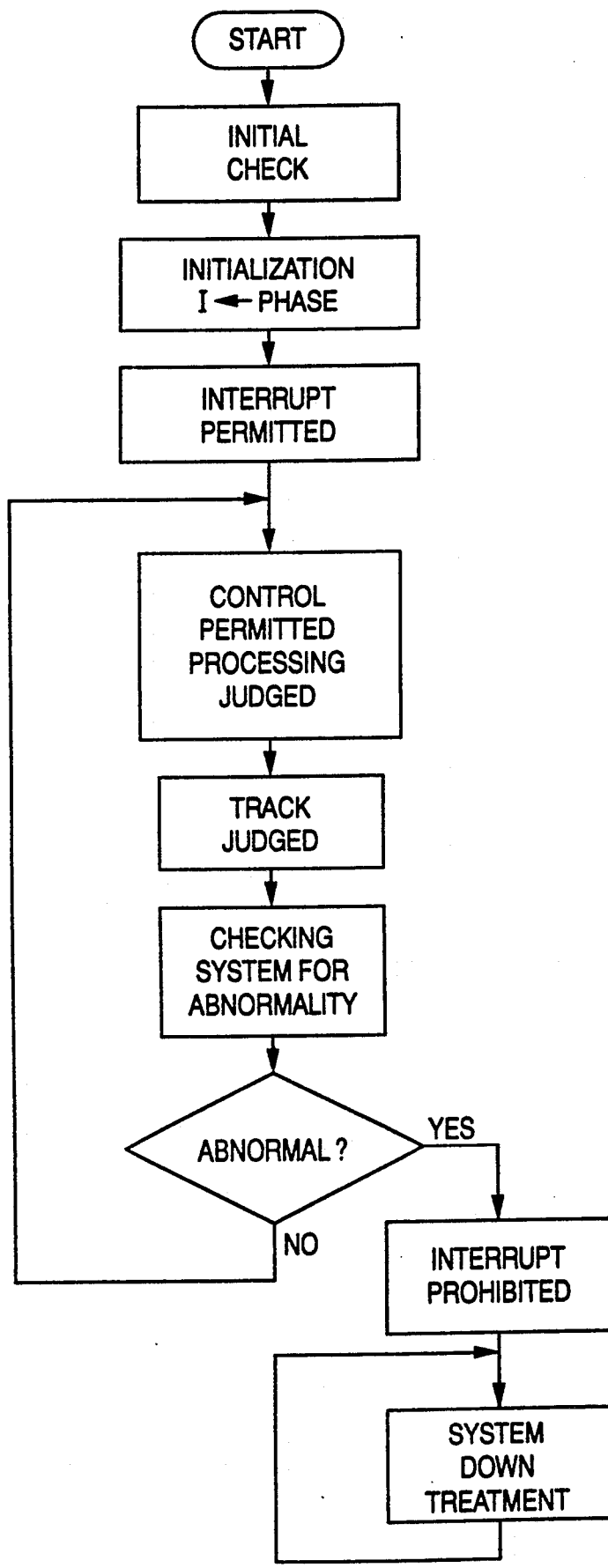
FIG. 5 is a flowchart of the main program.

FIG. 5 shows the main program adapted to be interrupted by the subprograms shown in FIGS. 3 and 4 at fixed time intervals. It comprises the steps of initial check, initialization, setting of the phase to Phase I, issuance of permission to interrupt, and non-emergent judging steps which are repeated infinitely as far as no abnormality is detected. The execution of the main loop is stopped temporarily while it is interrupted by the subprograms.

Figure 6:
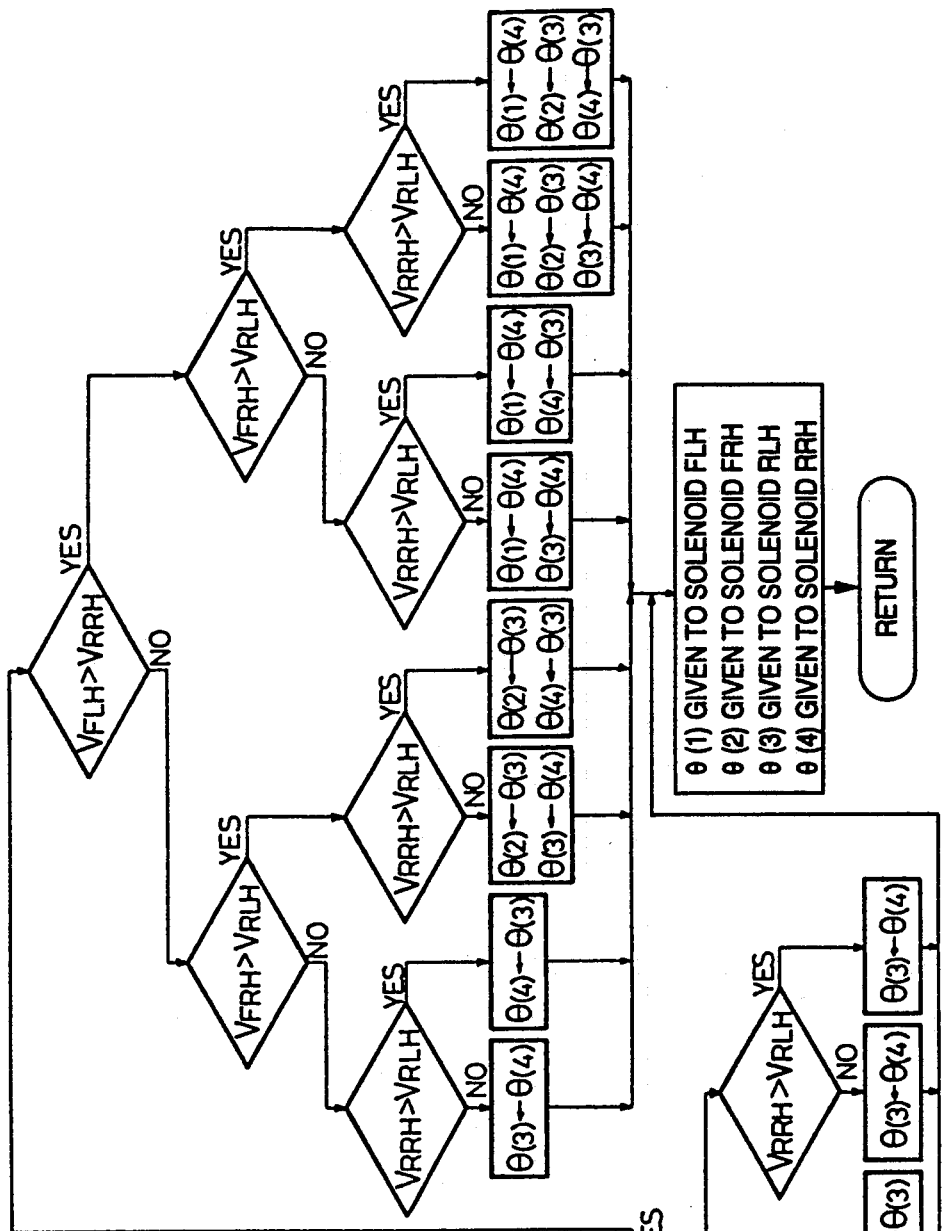
FIG. 6 is a flowchart of another sub-program which can be substituted for the sub-program shown in FIG. 3.

FIG. 6 shows a program which can be substituted for the subprogram shown in FIG. 3. They are substantially the same programs with the exception that in the former, the V(i) values are evaluated at an earlier stage and if it is decided to control the rear wheels as well as the diagonally opposed pairs of wheels on the select-low principle, the μ and SR values are compared with the reference values, the wheel speeds are compared with one another and the results θ(i) representative of the wheel at the side rotating at a lower speed are substituted for the results θ(i) representative of the wheel rotating at a higher speed.

What is claimed is:

1. An antilock brake control device for use in a full-time four-wheel drive motor vehicle, comprising: wheel rotation sensors for detecting the wheel rotations of the wheels of the vehicle; an electronic control circuit for calculating the wheel speeds, the estimated vehicle speed and the decelerations and the slip rates of the wheels from the wheel rotation signals detected and for producing fluid pressure control signals on the basis of the results of said calculation, and a fluid pressure control unit for controlling the braking forces on the wheels independently of one another in response to said fluid pressure control signals, said electronic control circuit having means for calculating the coefficient of friction $\mu$ between the wheels and the road surface based on the calculated vehicle deceleration and the sum of slip rates SR of both rear wheels based on a predetermined formula using the speeds of both rear wheels and a reference vehicle speed as the parameters to control all the wheels independently of one another if said coefficient of friction $\mu$ is higher than a first predetermined value $\mu_0$ and said sum of slip rates SR is smaller than a second predetermined value THR and to control the front wheels independently of each other and control the rear wheels based on the wheel rotation signal supplied from the wheel rotation sensor for one of the rear wheels rotating at a lower speed than the other, if said sum of slip rates SR is larger than said second predetermined value THR.

2. An antilock brake control device as claimed in claim 1, wherein said electronic control circuit is adapted to control the front wheels independently of each other and control the rear wheels based on the wheel rotation signal supplied from the wheel rotation sensor for one of the rear wheels rotating at a lower speed than the other, if said coefficient of friction $\mu$ is higher than said first predetermined value $\mu_0$ and said sum of slip rates SR is larger than said second predetermined value THR or if said coefficient of friction $\mu$ is lower than said first predetermined value $\mu^*$ and said sum of slip rates SR is smaller than said second predetermined value THR, and to control each front wheel based on the wheel rotation signal supplied from the wheel rotation sensor for one of each diagonally opposed pair of wheels which is rotating at a lower speed than the other and control the rear wheels based on the wheel rotation signal supplied from the wheel rotation sensor for one of the rear wheels rotating at a lower speed than the other, if said coefficient of friction $\mu$ is lower than said first predetermined value $\mu_0$ and said sum of slip rates SR is larger than said second predetermined value THR.

3. An antilock brake control device as claimed in claim 1, wherein said electronic control circuit is adapted to calculate a deceleration and slip rate of each wheel based on the wheel rotations detected by the respective wheel rotation sensors and to control the wheels independently of one another on the basis of the results of said calculation, if $\mu>\mu_0$ and SR<THR, to calculate a deceleration and slip rate of each of the front wheels based on the wheel rotations of the respective front wheels and to calculate a deceleration and slip rate of each of the rear wheels after substituting the lower one of the wheel rotation values of both rear wheels for the higher one, so as to control the wheels based on the results of said calculation, if $\mu>\mu_0$ and SR>THR or if $\mu<\mu_0$ and SR<THR, and to calculate the slip rate and the deceleration of each of the front wheels after substituting the lower one of the wheel rotation values of each diagonally opposite pair of wheels for the higher one and calculate the slip rate and the deceleration of each of the rear wheels after substituting the lower one of the wheel rotation values of the rear wheels so as to control the wheels based on the results of said calculation, if $\mu<\mu_0$ and SR>THR, said electronic control circuit further having a means for determining whether or not the respective wheels are showing a tendency to lock or to recover from a locking state and for providing a command to increase, hold or reduce the pressure to solenoids for each wheel based on the determination.

4. An antilock brake control device as claimed in claim 1, wherein said electronic control circuit is adapted to determine whether the wheels are showing a tendency to lock or to recover from a locking state based on the results of said calculation, and to compare the $\mu$ and SR values with said reference values $\mu_0$ and THR, and to control all the wheels independently of one another based on the results corresponding to the respective wheel rotation values detected, and if $\mu>\mu_0$ and SR<THR, to control the front wheels independently of each other based on the results corresponding to the wheel rotation values of the front wheels and to control the rear wheels based on the results provided by substituting the results corresponding to the lower one of the wheel rotation values of the rear wheels for the results corresponding to the higher one, if $\mu>\mu_0$ and SR>THR or if $\mu<\mu_0$ and SR<THR, and to control each front wheel based on the results provided by substituting the results corresponding to the lower one of the wheel rotation values of each diagonally opposed pair of wheels for the results corresponding to the higher wheel rotation value, if $\mu<\mu_0$ and SR>THR, said electronic control circuit further having a means for providing a pressure increase, pressure hold or pressure reduction command to solenoids for the wheels to control the wheels based on the determination.

* * * * *